US010254174B2

(12) United States Patent
Hoellmann

(10) Patent No.: US 10,254,174 B2
(45) Date of Patent: Apr. 9, 2019

(54) ENERGIZING AND MEASURING THE TEMPERATURE OF STATOR WINDINGS IN AN AT LEAST MOTOR-DRIVEN ELECTRIC POLYPHASE MACHINE

(71) Applicants: Robert Bosch GmbH, Stuttgart (DE); SEG AUTOMOTIVE GERMANY GMBH, Stuttgart (DE)

(72) Inventor: Manuel Hoellmann, Heubach (DE)

(73) Assignees: ROBERT BOSCH GMBH, Stuttgart (DE); SEG AUTOMOTIVE GERMANY GMBH, Stuttgart (DE)

( * ) Notice: Subject to any disclaimer, the term of this patent is extended or adjusted under 35 U.S.C. 154(b) by 196 days.

(21) Appl. No.: 15/110,201

(22) PCT Filed: Dec. 11, 2014

(86) PCT No.: PCT/EP2014/077427
§ 371 (c)(1),
(2) Date: Jul. 7, 2016

(87) PCT Pub. No.: WO2015/104134
PCT Pub. Date: Jul. 16, 2015

(65) Prior Publication Data
US 2016/0334281 A1    Nov. 17, 2016

(30) Foreign Application Priority Data

Jan. 10, 2014    (DE) .................. 10 2014 200 337

(51) Int. Cl.
*G01K 7/16*    (2006.01)
*H02P 21/14*    (2016.01)
*H02P 29/64*    (2016.01)

(52) U.S. Cl.
CPC ............... *G01K 7/16* (2013.01); *H02P 21/14* (2013.01); *H02P 29/64* (2016.02); *G01K 2217/00* (2013.01)

(58) Field of Classification Search
CPC ...... G01K 7/16; G01K 2217/00; H02P 29/64; H02P 21/14
See application file for complete search history.

(56) References Cited

U.S. PATENT DOCUMENTS

| 2011/0221366 A1* | 9/2011 | Gallegos-Lopez | ..... H02P 21/06 318/400.02 |
| 2016/0315572 A1* | 10/2016 | Magee | .................... H02P 21/24 |

FOREIGN PATENT DOCUMENTS

| CN | 1669211 A | 9/2005 |
| CN | 101780811 A | 7/2010 |

(Continued)

OTHER PUBLICATIONS

Kilowatt Classroom, VFD Fundamentals, 2003.*
(Continued)

*Primary Examiner* — Kyle R Quigley
(74) *Attorney, Agent, or Firm* — Norton Rose Fulbright US LLP; Gerard Messina

(57) ABSTRACT

A method for energizing the stator windings of a rotating field machine operable in motor mode, the stator windings respectively being impinged upon with phase currents that are predefined using a vector-based method. The phase currents are impinged upon at least in part with bias currents that are determined by the vector-based method in such a way that they exhibit no torque effectiveness in the rotating field machine.

8 Claims, 7 Drawing Sheets

(56) References Cited

FOREIGN PATENT DOCUMENTS

| | | |
|---|---|---|
| CN | 101783646 A | 7/2010 |
| CN | 101931352 A | 12/2010 |
| CN | 102324825 A | 1/2012 |
| DE | 10119201 A1 | 10/2002 |
| DE | 10346060 A1 | 5/2005 |
| DE | 102011076667 A1 | 12/2012 |
| DE | 102011078841 A1 | 1/2013 |
| EP | 0584615 A1 | 3/1994 |
| EP | 0720266 A1 | 7/1996 |
| EP | 2421147 A1 | 2/2012 |

OTHER PUBLICATIONS

International Search Report dated Mar. 19, 2015, of the corresponding International Application PCT/EP2014/074980 filed Nov. 19, 2014, 3 pages.

Levi et al., "Operating Principles of a Novel Multiphase Multimotor Vector-Controlled Drive", IEEE Transactions on Energy Conversion, IEEE Service Center, Piscataway, NJ, US, vol. 19, No. 3, Sep. 1, 2004, pp. 508-517, XP011116624.

\* cited by examiner

φ [rad]

ENERGIZING AND MEASURING THE TEMPERATURE OF STATOR WINDINGS IN AN AT LEAST MOTOR-DRIVEN ELECTRIC POLYPHASE MACHINE

FIELD

The present invention relates to a method for determining the temperature of stator windings of a rotating field electric machine operable at least in motor mode and its implementation.

BACKGROUND INFORMATION

Conventional generators for converting mechanical energy into electrical energy in a motor vehicle are available. Claw pole generators are usually used in this connection. According to the existing art, these are usually equipped with electrical excitation. Because claw-pole generators generate alternating current, usually three-phase, rectification is necessary for the usual DC voltage electrical systems of motor vehicles. Rectifiers based on semiconductor diodes are existing art.

Conventional generators that can also be used for vehicle drive purposes (i.e., are also operable in motor mode) are available in, e.g., the hybrid vehicles sector. The objective here is to assist the internal combustion engine at low rotation speeds, at which it cannot yet supply its full torque (boost operation, turbo lag compensation). In addition, active electric braking allows the vehicle's kinetic energy to be fed back into the vehicle's electrical system (regeneration). Permanently excited synchronous machines that are operated at higher voltages (typically more than 100 V) are usually used in this context. This results in a comparatively complex system configuration together with considerable modifications in the drive train as well as comparatively laborious safety measures due to the high voltages.

Conventional rotating field electric machines are also available. These can be embodied as three-phase electric machines having no neutral conductor. The phase currents, used in motor mode, of corresponding rotating field machines or of their stator windings can be defined using vector-oriented control methods (also referred to as "vector control"). The Clarke or Park transformation (or the respective inverse transformations) are utilized for this. For three-phase rotating field machines all three phase currents are uniquely defined respectively via the vectors $\alpha$ and $\beta$ in the Clarke transformation and the vectors d and q in the Park transformation, since only two phase currents can be freely determined and the third results from summing the other two currents.

Terms such as "rotating field electric machine," "rotating field electric drive," and "electric motor" are used synonymously hereinafter. This refers in each case to electric machines operable at least at times in motor mode, optionally also in generator mode, for example for regeneration, whose stator windings in motor mode are commutated via a power converter with currents (phase currents) in accordance with a control application pattern, so that a rotating electric field is formed. The "stator windings" are constituted here by one or more assemblages of electrical coils in, for example, a star configuration or delta configuration. When it is stated below that "phases" are energized or impinged upon with currents, this means that a corresponding current is flowing through the respective stator windings. The aforesaid indications are synonymous therewith.

In order to protect the electric machine, in particular its stator windings, from excessively high temperature, it is desirable to know the actual temperature thereof. Conventional methods without the aid of temperature sensors operate by way of a determination of the resistance of the stator windings. Using the ohmic resistance thereby ascertained, it is possible to determine the temperature of the winding. The measurement accuracy depends, however, on the tolerance of the current measurement, the accuracy of the motor model used for calculation, and principally on the proportion of the ohmic resistance in terms of the total reactance of the machine.

European Patent No. EP 2 421 147 A1 describes a method for the identification, without rotary encoder, of electrical equivalent circuit diagram parameters of a three-phase synchronous motor. Levi et al., IEEE Trans. Energy Convers. 19(3), 2004, 508-517 describe foundations of the operation of a novel multi-phase vector-regulated drive having multiple motors. European Patent No. EP 0 584 615 A1 relates to a measuring device for determining the winding temperature of a three-phase electric machine.

A need therefore exists for improved capabilities for furnishing corresponding values for maximally exact temperature determination without the aid of temperature sensors.

SUMMARY

In light of the above, the present invention provides a method for determining the temperature of the stator windings of a rotating field electric machine operable at least in motor mode and its implementation. Preferred embodiments are described below.

The presence invention relates to the targeted utilization of the degrees of freedom in the context of energization of n phases or n stator windings (hereinafter also referred to as an "n-phase system") of a rotating field electric machine, specifically in such a way that current components which have no effect on the torque-producing field can be established in the individual phases. This makes possible improved determination of the respective (temperature-dependent) ohmic resistance in the phases or stator windings. An example method according to the present invention may be implemented, for example, using a method for vector control in the context of control application to the rotating field machine. The present invention offers the same advantages, however, in the context of open-loop vector control or other methods. Corresponding methods are grouped together hereinafter under the term "vector-based methods." It is predominantly for reasons of clarity that reference is specifically made below to a method for closed-loop vector control.

The present invention is described below using the example of a five-phase rotating field electric machine. The conventional Clarke transformation for a three-phase system is expanded according to the present invention for the five-phase system so that the latter can be completely described. This makes it possible to achieve a more accurate measurement of the stator temperature, as well as various additional functions. As explained below, however, the present invention is also suitable for all rotating field machines in which a sufficient number of degrees of freedom exist for establishing the phase currents, so that current components that have no effect on the torque-producing field can be established.

The aforesaid additional functions encompass in particular energizing the stator windings without generating an overall torque (for example in order to specifically heat the stator windings at a standstill for self-tests and/or for calibration functions), and dealing with harmonics of the phase currents in the five-phase system. The Clarke transformations used in this instance (see equation 3 below) do not make all the harmonics visible.

The present invention proceeds from a method for energizing the stator windings of a rotating field machine operated in motor mode, the stator windings respectively being impinged upon with phase currents that are predefined using a vector-based method. Provision is made according to the present invention to impinge upon the phase currents at least in part with bias currents that are determined by the vector-based method in such a way that they exhibit no torque effectiveness in the rotating field machine.

If currents or current components used to impinge upon the stator windings generate a torque that acts on the rotor of the rotating field machine, the term "torque effectiveness" is used here. As mentioned, the stator windings are conventionally commutated with a control application pattern that causes a rotating electric field to form. These therefore possess torque effectiveness or are torque-effective. The present invention, conversely, provides for the use of currents or (additional) current components that, considered of themselves, exert no, or no appreciable, force on the rotor, i.e., possess no or negligible torque effectiveness.

A prerequisite for utilization of the method according to the present invention is, as mentioned, the existence of a number of degrees of freedom for energization of the stator windings in addition to the degrees of freedom present in the context of regular three-phase rotating field machines having no neutral conductor. As also explained below with reference to the Figures, the number of degrees of freedom in such three-phase rotating field machines is two.

According to Kirchhoff's law (also referred to as the "current node rule"), the sum of the currents in the phase of a rotating field machine of this kind must be zero. Upon energization of three-phase rotating field machines or the stator windings thereof, the two existing degrees of freedom for a torque-producing energization are "used up." In rotating field machines having more phases, on the other hand, or also in three-phase rotating field machines having a neutral conductor, at least one further degree of freedom exists which can be used to impress the phase currents of a DC component (bias current) that in turn does not contribute to torque production.

When "bias currents," with which the phase currents are impinged upon, are referred to in the context of this invention, these are effectively added or subtracted quantities by which the phase currents are to be increased or reduced. These are, for example, direct currents or DC current components as also explained below, i.e., constant bias currents. They are determined using the underlying vector-based method. In other words, impingement with corresponding bias currents encompasses, for example, a superimposition of (positive or negative) direct currents.

A "bias current" can also, however, be understood to mean herein currents that change. Currents having no torque effectiveness do not need to be absolutely constant, but instead can also change (at a sufficiently low frequency). In the context of a vector-based method this can refer to changing values for $\gamma$ or $\delta$. As also explained below, at high frequencies the influence of ohmic resistance becomes less, so that they are no longer usable for temperature determination. If the frequency of the non-torque-effective current component is low enough, however, a temperature determination is possible.

If the phase currents are present as constant currents (or for a current value of zero), constant bias currents respectively result, for example, in a constant current flow. If constant direct currents are flowing through all stator windings, this does not result in torque production in the rotating field machine, but the stator windings do heat up. This can also be used, for example, for calibration functions and/or to test corresponding stator windings with a predefined maximum current.

Conversely, as is typically the case in the context of motor-mode operation of a corresponding rotating field machine, if the phase currents are predefined as currents that oscillate at a specific phase current amplitude and a specific phase current frequency around a center value (without the impingement according to the present invention with bias currents, these currents oscillate around the zero line), the result of the impingement according to the present invention with the bias currents is conversely an increase or a reduction in the baseline of a corresponding sinusoidal phase current.

As also explained below, according to the present invention, the bias currents are predefined on the basis of a transformation specification that is a transformation specification derived from a Clarke transformation. With this, current vectors that are independent of torque-effective current vectors and themselves possess no torque effectiveness are converted into corresponding current values and are used to determine the offset values.

The example method according to the present invention is suitable in particular for energizing the stator windings of a rotating field machine in which at least four degrees of freedom exist for energization, as already explained. The invention is equally suitable for rotating field machines that are embodied as synchronous or as asynchronous machines.

In accordance with the present invention, a method is provided for determining the temperature of stator windings of a rotating field machine, in which method an ohmic resistance of the stator windings is ascertained. Here the stator windings are energized in accordance with a method as described above at least while their ohmic resistance is being ascertained. Energization can also be accomplished, in particular, before the ohmic resistance is ascertained, so that the stator windings heat up reproducibly.

A calculation unit according to the present invention, for example a control device of a rotating field electric machine, is configured to carry out, in particular by programmed execution, a method according to the present invention.

Implementation of the method in the form of software is also advantageous, since this engenders particular low costs, in particular if an executing control device is also used for further tasks and is therefore present in any case. Suitable data media for furnishing the computer program are, in particular, diskettes, hard drives, flash memories, EEPROMs, CD-ROMs, DVDs, and so forth. Downloading of a program via computer networks (Internet, intranet, etc.) is also possible.

Further advantages and embodiments of the present invention are evident from the description herein and from the figures.

It is understood that the features recited above and those yet to be explained below are usable not only in the respective combination indicated but also in other combinations or in isolation, without departing from the scope of the present invention.

The present invention is depicted schematically in the figures and is described in detail below with reference to the figures.

DETAILED DESCRIPTION OF EXAMPLE EMBODIMENTS

A five-phase synchronous rotating field machine is used, for example, in the context of the present invention. For explanation, however, firstly a three-phase synchronous rotating field machine having a corresponding three-phase stator winding will be discussed here.

For corresponding three-phase rotating field machines, the current node rule states, as is generally known, that the sum of the phase currents (hereinafter referred to as Ia, Ib, and Ic) must be zero. Of the phase currents Ia, Ib, and Ic, two currents can therefore be freely selected and the third results respectively in accordance with the current node rule. In other words, the phase currents can be selected with two degrees of freedom.

The Clarke transformation, also referred to as an α,β transformation, serves to convert three-phase magnitudes such as those in a corresponding three-phase rotating field machine having axes a, b, and c (optionally also referred to as U, V, and W, etc.) into a simpler two-axis coordinate system having axes α and β. The Clarke transformation, together with the d,q transformation, is one of the basic mathematical principles for vector control of rotating field machines, and describes one of several possible space vector representations.

The right-angle coordinate system on which the Clarke transformation is based is selected to be equal to the stationary stator, and is mapped in the complex plane with the real portion α and imaginary portion β. In a three-phase rotating field machine the three stator windings are each offset by an angle of 120° with respect to one another, the axis a (or U) by definition coinciding with the real axis α. The Clarke transformation converts the three phase currents Ia, Ib, and Ic into equivalent currents in the α,β coordinate system.

The following is applicable to the Clarke transformation:

$$\begin{bmatrix} I_\alpha \\ I_\beta \\ 0 \end{bmatrix} = \frac{2}{3} \begin{bmatrix} \cos(0) & \cos\left(\frac{2\pi}{3}\right) & \cos\left(\frac{4\pi}{3}\right) \\ \sin(0) & \sin\left(\frac{2\pi}{3}\right) & \sin\left(\frac{4\pi}{3}\right) \\ \frac{1}{2} & \frac{1}{2} & \frac{1}{2} \end{bmatrix} \begin{bmatrix} I_a \\ I_b \\ I_c \end{bmatrix}. \quad (1)$$

The corresponding equation for the inverse Clarke transformation is:

$$\begin{bmatrix} I_a \\ I_b \\ I_c \end{bmatrix} = \frac{2}{3} \begin{bmatrix} \cos(0) & \sin(0) \\ \cos\left(\frac{2\pi}{3}\right) & \sin\left(\frac{2\pi}{3}\right) \\ \cos\left(\frac{4\pi}{3}\right) & \sin\left(\frac{4\pi}{3}\right) \end{bmatrix} \begin{bmatrix} I_\alpha \\ I_\beta \end{bmatrix}. \quad (2)$$

Because of the current node rule, on the other hand, a five-phase rotating field machine possesses four selectable phase currents; the remaining (fifth) phase current is obtained once again from the requirement that the sum of the phase currents must be zero. Four degrees of freedom therefore exist.

Figure 2:
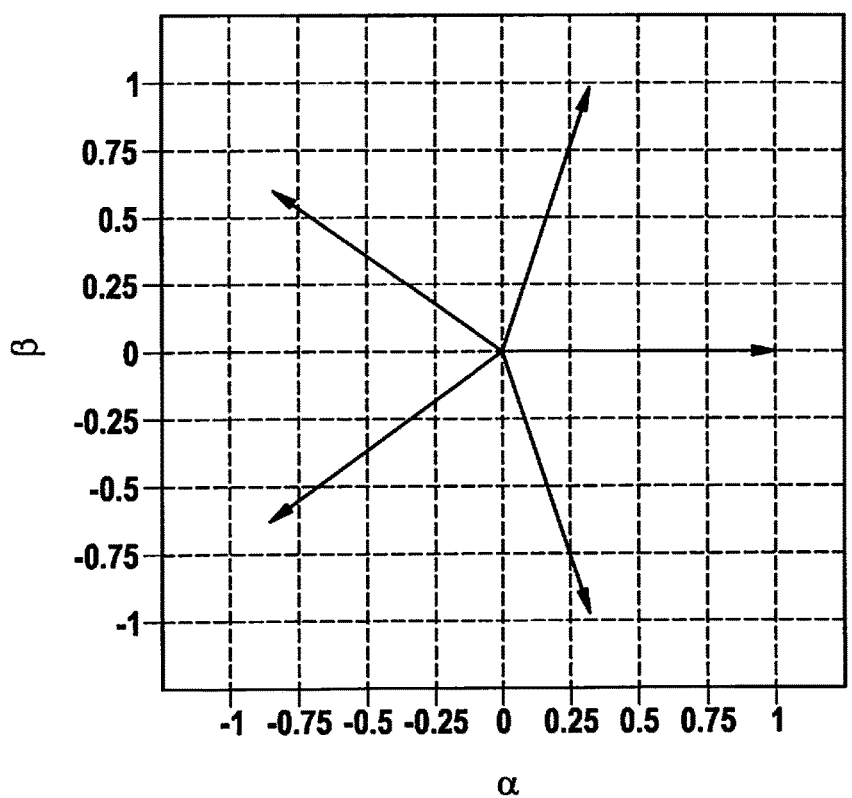
FIG. 2 is a schematic depiction illustrating the direction of action of the phase currents in a five-phase rotating field machine.

The phase currents of the five-phase rotating field machine are labeled Ia to Ie below. The directions of action of the phase currents are disposed similarly to those for a three-phase rotating field machine, although the angle between the adjacent phases is 72° (2π/5). FIG. 2 illustrates the directions of action of the phase currents, schematically depicted in a diagram having axes α and β.

Figure 1:
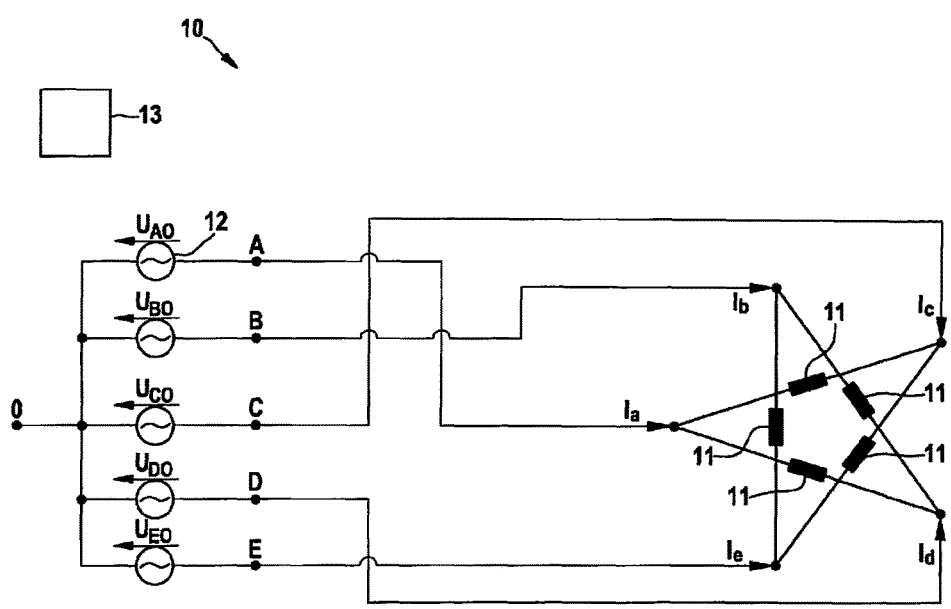
FIG. 1 is a schematic partial depiction of a five-phase rotating field machine in which a method according to the present invention can be used.

For further illustration, FIG. 1 shows a five-phase rotating field machine 10 in which the five stator windings 11 of a stator are connected to one another in a star configuration. Five electrical terminals A to E are provided for energization of stator windings 11, the terminals being connected to alternating current sources 12, for example outputs of a ten-pulse active rectifier to which control is applied via a control device 13. The voltages dropping across alternating current sources 12 with respect to a terminal 0, for example ground, are labeled UA0 to UE0, and the phase currents are labeled Ia to Ie.

The stator field resulting from the phase currents can likewise be represented in the two-axis GO coordinate system. An adapted Clarke transformation for five phases is used for this:

$$\begin{bmatrix} I_\alpha \\ I_\beta \end{bmatrix} = \frac{2}{5} \begin{bmatrix} \cos(0) & \cos\left(\frac{2\pi}{5}\right) & \cos\left(\frac{4\pi}{5}\right) & \cos\left(\frac{6\pi}{5}\right) & \cos\left(\frac{8\pi}{5}\right) \\ \sin(0) & \sin\left(\frac{2\pi}{5}\right) & \sin\left(\frac{4\pi}{5}\right) & \sin\left(\frac{6\pi}{5}\right) & \sin\left(\frac{8\pi}{5}\right) \end{bmatrix} \begin{bmatrix} I_a \\ I_b \\ I_c \\ I_d \\ I_e \end{bmatrix} \quad (3)$$

It is no longer possible here, however, to unequivocally back-transform the currents Iα and Iβ in vector representation into the phase currents Ia to Ie, since the phase current is overdetermined in the context of the four degrees of freedom that exist.

Figure 2A:
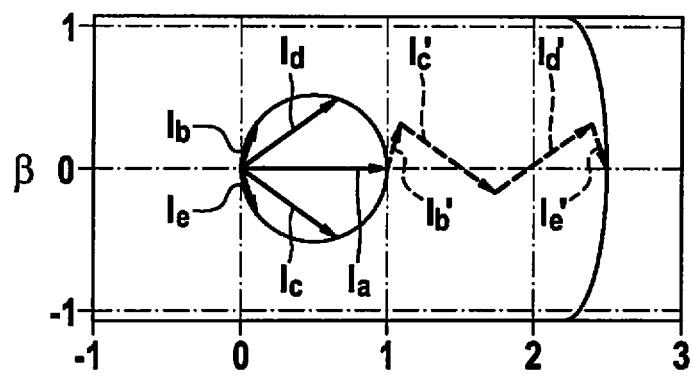
FIGS. 2A to 2C illustrate problems in the back-transformation of currents, in a vector depiction for five phases.
Figure 2B:
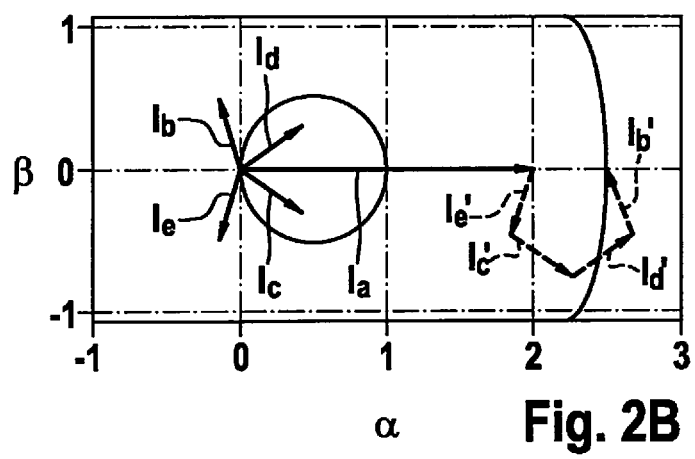
Figure 2C:
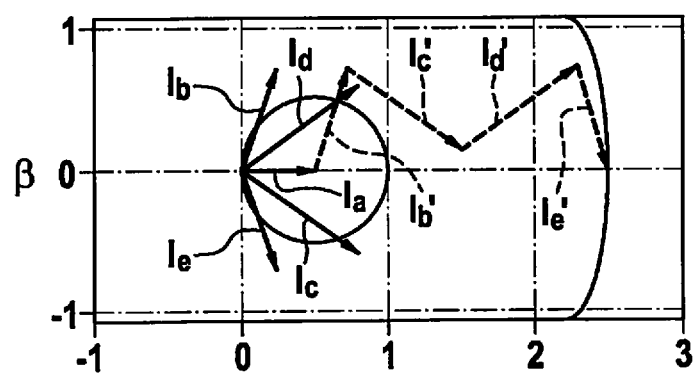

As shown in FIGS. 2A to 2C, the same resulting vector can be created using several combinations of the phase currents. FIGS. 2A to 2C illustrate various combination possibilities for a respectively resulting equivalent resulting vector α=2.5 and β=0 (this itself is not depicted in the interest of clarity) in the α,β coordinate system. The vectors Ia to Ie of the individual phases are shown proceeding from the origin of the coordinate system. Vectors Ib' to Ie' depicted with dashed lines are the vectors displaced in parallel fashion for vector addition. Vectors Ia to Ie are therefore linearly dependent on one another.

As in a three-phase system, however, a sinusoidal curve for the phase currents is desired. The phase energization is therefore converted using sinusoidal curves over the rotor position angle. Specifying the sine curve and an identical amplitude for the phase currents thus makes an unequivocal inverse Clarke transformation possible after all, as depicted in the equation below. FIG. 2A also corresponds to this.

$$\begin{bmatrix} I_a \\ I_b \\ I_c \\ I_d \\ I_e \end{bmatrix} = \begin{bmatrix} \cos(0) & \sin(0) \\ \cos\left(\frac{2\pi}{5}\right) & \sin\left(\frac{2\pi}{5}\right) \\ \cos\left(\frac{4\pi}{5}\right) & \sin\left(\frac{4\pi}{5}\right) \\ \cos\left(\frac{6\pi}{5}\right) & \sin\left(\frac{6\pi}{5}\right) \\ \cos\left(\frac{8\pi}{5}\right) & \sin\left(\frac{8\pi}{5}\right) \end{bmatrix} \begin{bmatrix} I_\alpha \\ I_\beta \end{bmatrix} \quad (4)$$

Two of the four degrees of freedom are described by the torque-producing component $\alpha,\beta$. For the remaining two degrees of freedom the Clarke transformation is expanded according to the present invention in such a way that there is no effect on the $\alpha,\beta$ vector of the phase currents. The two additional degrees of freedom are referred to hereinafter as $\gamma$ and $\delta$. This component is depicted in the following transformation:

$$\begin{bmatrix} I_\gamma \\ I_\delta \end{bmatrix} = \frac{2}{5} \begin{bmatrix} \cos(0) & \cos\left(\frac{4\pi}{5}\right) & \cos\left(\frac{8\pi}{5}\right) & \cos\left(\frac{12\pi}{5}\right) & \cos\left(\frac{16\pi}{5}\right) \\ \sin(0) & \sin\left(\frac{4\pi}{5}\right) & \sin\left(\frac{8\pi}{5}\right) & \sin\left(\frac{12\pi}{5}\right) & \sin\left(\frac{16\pi}{5}\right) \end{bmatrix} \begin{bmatrix} I_a \\ I_b \\ I_c \\ I_d \\ I_e \end{bmatrix} \quad (5)$$

The inverse transformation to this is correspondingly:

$$\begin{bmatrix} I_a \\ I_b \\ I_c \\ I_d \\ I_e \end{bmatrix} = \begin{bmatrix} \cos(0) & \sin(0) \\ \cos\left(\frac{4\pi}{5}\right) & \sin\left(\frac{4\pi}{5}\right) \\ \cos\left(\frac{8\pi}{5}\right) & \sin\left(\frac{8\pi}{5}\right) \\ \cos\left(\frac{12\pi}{5}\right) & \sin\left(\frac{12\pi}{5}\right) \\ \cos\left(\frac{16\pi}{5}\right) & \sin\left(\frac{16\pi}{5}\right) \end{bmatrix} \begin{bmatrix} I_\gamma \\ I_\delta \end{bmatrix} \quad (6)$$

In combination these result respectively in an expanded Clarke transformation:

$$\begin{bmatrix} I_\alpha \\ I_\beta \\ I_\gamma \\ I_\delta \end{bmatrix} = \frac{2}{5} \begin{bmatrix} \cos(0) & \cos\left(\frac{2\pi}{5}\right) & \cos\left(\frac{4\pi}{5}\right) & \cos\left(\frac{6\pi}{5}\right) & \cos\left(\frac{8\pi}{5}\right) \\ \sin(0) & \sin\left(\frac{2\pi}{5}\right) & \sin\left(\frac{4\pi}{5}\right) & \sin\left(\frac{6\pi}{5}\right) & \sin\left(\frac{8\pi}{5}\right) \\ \cos(0) & \cos\left(\frac{4\pi}{5}\right) & \cos\left(\frac{8\pi}{5}\right) & \cos\left(\frac{12\pi}{5}\right) & \cos\left(\frac{16\pi}{5}\right) \\ \sin(0) & \sin\left(\frac{4\pi}{5}\right) & \sin\left(\frac{8\pi}{5}\right) & \sin\left(\frac{12\pi}{5}\right) & \sin\left(\frac{16\pi}{5}\right) \end{bmatrix} \begin{bmatrix} I_a \\ I_b \\ I_c \\ I_d \\ I_e \end{bmatrix} \quad (7)$$

and in an expanded inverse Clarke transformation:

$$\begin{bmatrix} I_a \\ I_b \\ I_c \\ I_d \\ I_e \end{bmatrix} = \begin{bmatrix} \cos(0) & \sin(0) & \cos(0) & \sin(0) \\ \cos\left(\frac{2\pi}{5}\right) & \sin\left(\frac{2\pi}{5}\right) & \cos\left(\frac{4\pi}{5}\right) & \sin\left(\frac{4\pi}{5}\right) \\ \cos\left(\frac{4\pi}{5}\right) & \sin\left(\frac{4\pi}{5}\right) & \cos\left(\frac{8\pi}{5}\right) & \sin\left(\frac{8\pi}{5}\right) \\ \cos\left(\frac{6\pi}{5}\right) & \sin\left(\frac{6\pi}{5}\right) & \cos\left(\frac{12\pi}{5}\right) & \sin\left(\frac{12\pi}{5}\right) \\ \cos\left(\frac{8\pi}{5}\right) & \sin\left(\frac{8\pi}{5}\right) & \cos\left(\frac{16\pi}{5}\right) & \sin\left(\frac{16\pi}{5}\right) \end{bmatrix} \begin{bmatrix} I_\alpha \\ I_\beta \\ I_\gamma \\ I_\delta \end{bmatrix} \quad (8)$$

The values $I_\gamma$ and $I_\delta$ have no influence on $I_\alpha$ and $I_\beta$ and thus no effect on torque. The mutual independence of the aforesaid variables can be demonstrated by a transformation from the variables $\gamma$ and $\delta$ to the phase values using the inverse transformation according to equation (6), and a subsequent Clarke transformation into the $\alpha,\beta$ coordinate system (not depicted here in the interest of clarity).

An explanation will be given below of the manner in which, in consideration of the principles explained above, an improved resistance measurement required for a temperature determination can be accomplished during operation of the rotating field machine.

The manner in which a resistance calculation can be made according to the existing art, exclusively with $\alpha,\beta$ coordinates and the d,q coordinates derived therefrom, will firstly be explained. The d,q system and the Park transformation used in this connection are known from the literature and will therefore not be explained here. The relevant equations are:

$$u_d = R_s \cdot i_d - p \cdot \omega \cdot L_q \cdot i_q$$
$$u_q = R_s \cdot i_q - p \cdot \omega \cdot L_d \cdot i_d + p \cdot \omega + p \cdot \omega \cdot \psi_R \quad (9)$$

in which $u_d$ and $u_q$ are the stator voltages in d,q coordinates, $i_d$ and $i_q$ the stator currents in d,q coordinates, $\psi_R$ is the rotor flux concatenation, $R_s$ the stator resistance, and $L_d$ and $L_q$ are respectively the longitudinal and transverse conductor conductivity.

As is evident from equations (9), the voltage/current ratio depends both on the stator resistance and on the inductances and the induced voltage. The higher the rotation speed, the less the influence of the ohmic resistance becomes. The rotating field electric machine is operated principally at high rotation speeds, however, so that a resistance calculation for temperature determination is possible only with difficulty.

The correlation between temperature and resistance is known from the literature:

$$R(T) = R(T_0)(1 + \alpha_{T0} \cdot (T - T)) \quad (10)$$

A significant improvement can be achieved here according to the present invention:

For field-oriented operation, the currents $I_\alpha$ and $I_\beta$ are adjusted and regulated in known fashion. The values for $I_\gamma$ and $I_\delta$ are independent thereof, as deduced above, and can be established arbitrarily within the operating limits. It is thus possible to set an additional current vector in parallel.

During field-oriented operation in the steady state, the $\alpha,\beta$ vector rotates at the frequency of the electrical rotation angle of the rotating field machine at a constant vector length. The angular frequency of the $\alpha,\beta$ vector is thus linked to the number of rotations of the rotating field machine. The additional $\gamma,\delta$ vector now makes it possible to impinge upon the phases with a superimposed DC voltage. A superimposed direct current is established. No torque ripple is produced as a result of the $\gamma,\delta$ DC vector.

In other words, in motor mode a first current vector (the α,β vector) is therefore predefined in a vector-oriented control procedure in order to impinge upon the stator windings with currents that generate a torque in the rotating field machine. A second current vector (the γ,δ vector) is additionally predefined in order to impinge upon the stator windings with currents (bias currents) that do not generate a torque in the rotating field machine.

Figure 3A:
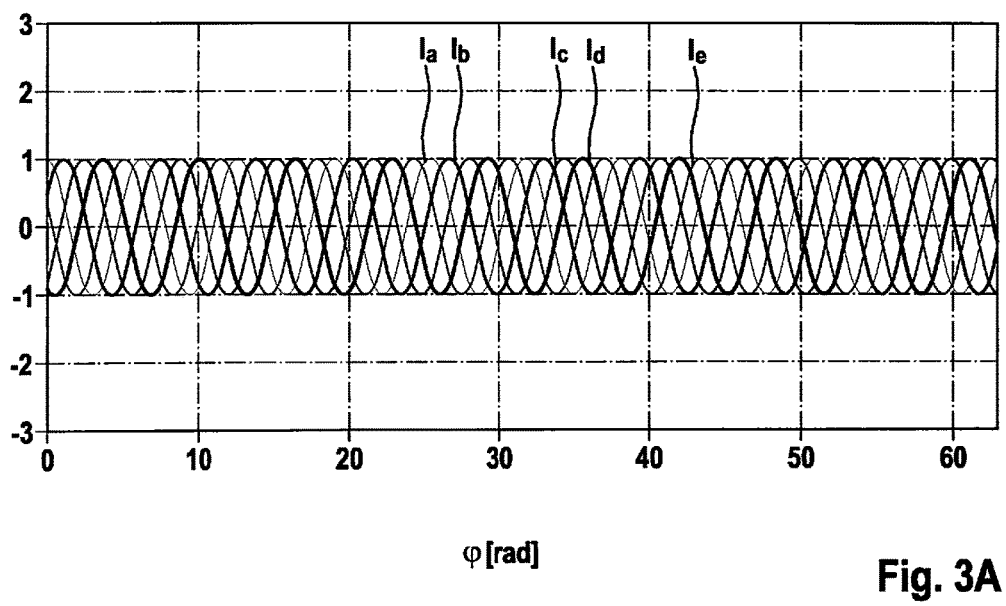
FIGS. 3A and 3B illustrate phase currents and currents in a vector depiction, without use of a method according to the present invention.
Figure 3B:
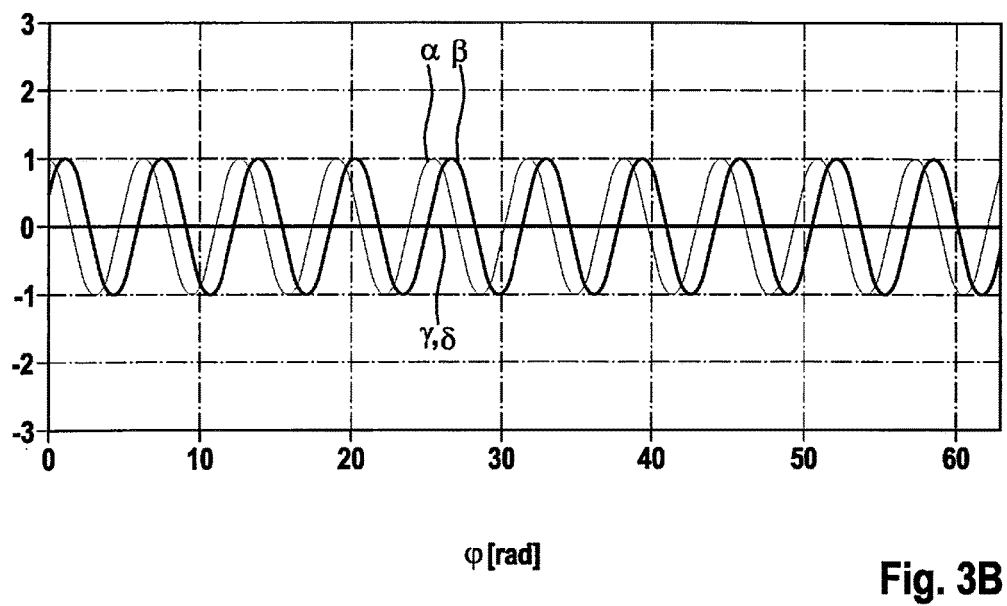
Figure 4A:
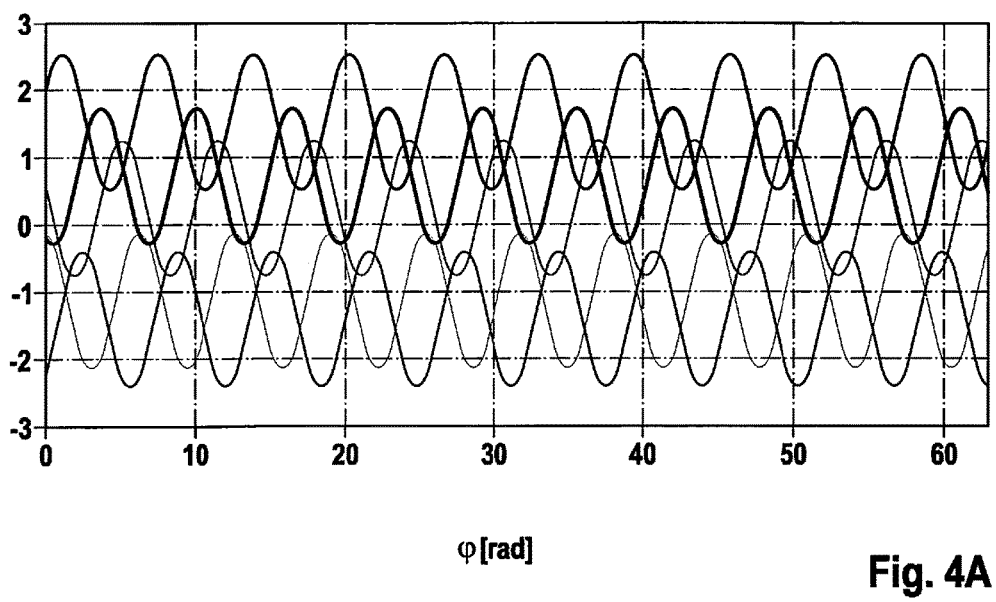
FIGS. 4A and 4B illustrate phase currents and currents in a vector depiction, with use of a method according to the present invention.
Figure 4B:
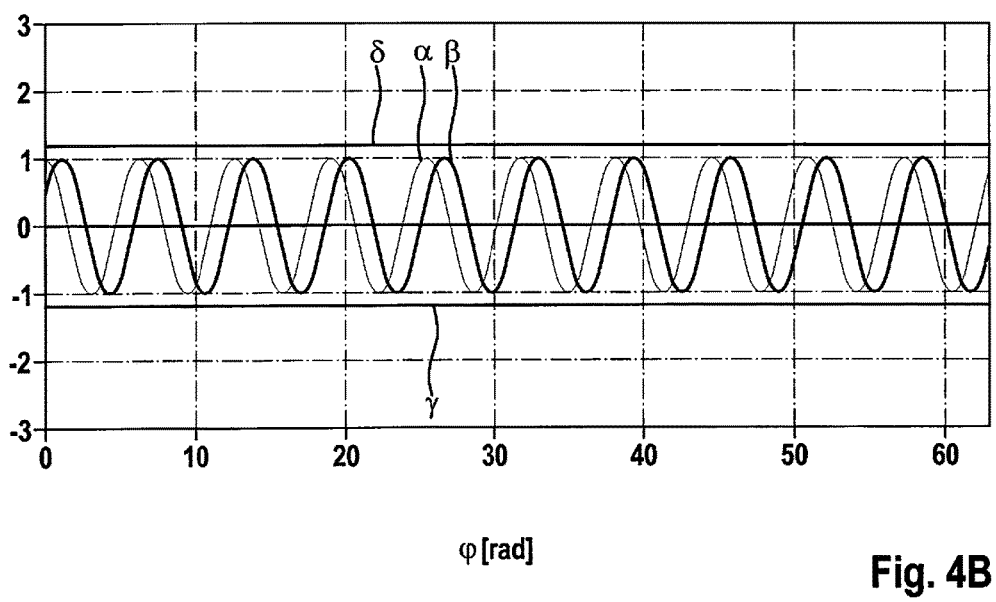

FIGS. 3A and 3B, and 4A and 4B, respectively depict phase currents (FIGS. 3A and 4A) and the rotating α,β vectors (FIGS. 3B and 4B) plotted against the phase angle φ (in rad). As depicted in FIG. 3B, γ,δ is equal to zero. FIG. 4B illustrates the same α,β vector with a superimposed γ,δ DC component (bias current). The torque generated thereby is identical, however, since no torque is induced by the γ,δ DC component.

Using the resistance determination R=U/I, the temperature of the stator winding can be determined by way of the resistance using the temperature coefficients according to equation (10).

The advantage as compared with temperature determination in accordance with the existing art is firstly that a concurrent calculation of inductance is not necessary, and secondly that a highly accurate machine model of the inductance in the system to be calculated also does not need to be available for this purpose. The temperature can thus be calculated substantially more accurately than with existing methods with no torque deviations.

If desired, phase currents can also be established in the rotating field machine without producing any torque. It is possible to use exclusively the γ,δ vector for this (with no α,β vector). Applications for this are, for example, uniform heating of all phases of the rotating field machine and/or a self-test of the phase currents up to the maximum current.

Because of the incomplete mapping of the phase currents in the α,β coordinate system, not all harmonics are visible in the context of a transformation or back-transformation exclusively in accordance with equations (5) or (6) respectively (i.e. with a regular Clarke transformation using the α,β coordinate system). The harmonics meant here are those that involve an integral multiple of the basic frequency of the phase currents. The table below shows the system in which the respective harmonics are mapped:

| Multiple of fundamental wave | | | | | | | | |
|---|---|---|---|---|---|---|---|---|
| 1 | 2 | 3 | 4 | 5 | 6 | 7 | 8 | 9 |
| mapped in α, β | γ, δ | γ, δ | α, β | — | α, β | γ, δ | γ, δ | α, β |

The fifth harmonic cannot occur because the rule regarding the sums of the five phase currents cannot be complied with as a result. A correction or compensation can be performed according to the present invention in the respective system (α,β or γ,δ). This is not possible according to the existing art.

It should be emphasized that alternative transformation specifications can also be used in the context of the present invention. Examples are given in the equations below:

$$\begin{bmatrix} I_{\gamma 1} \\ I_{\delta 1} \end{bmatrix} = \frac{2}{5} \begin{bmatrix} \cos(0) & \cos\left(\frac{6\pi}{5}\right) & \cos\left(\frac{12\pi}{5}\right) & \cos\left(\frac{18\pi}{5}\right) & \cos\left(\frac{24\pi}{5}\right) \\ \sin(0) & \sin\left(\frac{6\pi}{5}\right) & \sin\left(\frac{12\pi}{5}\right) & \sin\left(\frac{18\pi}{5}\right) & \sin\left(\frac{24\pi}{5}\right) \end{bmatrix} \begin{bmatrix} I_a \\ I_b \\ I_c \\ I_d \\ I_e \end{bmatrix} \quad (11)$$

$$\begin{bmatrix} I_{\gamma} \\ I_{\delta} \end{bmatrix} = \frac{2}{5} \begin{bmatrix} \cos(\theta) & \cos\left(\theta - \frac{6\pi}{5}\right) & \cos\left(\theta - \frac{12\pi}{5}\right) & \cos\left(\theta - \frac{18\pi}{5}\right) & \cos\left(\theta - \frac{24\pi}{5}\right) \\ -\sin(\theta) & -\sin\left(\theta - \frac{6\pi}{5}\right) & -\sin\left(\theta - \frac{12\pi}{5}\right) & -\sin\left(\theta - \frac{18\pi}{5}\right) & -\sin\left(\theta - \frac{24\pi}{5}\right) \end{bmatrix} \begin{bmatrix} I_a \\ I_b \\ I_c \\ I_d \\ I_e \end{bmatrix} \quad (12)$$

The present invention is suitable for rotating field electric machines having five phases, but in principle also for other rotating field machines having a corresponding number of degrees of freedom, for example three-phase rotating field machines having a neutral conductor.

The present invention can also be utilized in rotating field machines having two assemblages of stator windings for one rotor, for example having six stator windings in two groups of three stator windings each. In the assemblages just mentioned, for example, in each of the groups the stator windings are offset 120° from one another and the stator windings of the second group are in turn disposed with a 30° offset from one another. The aforesaid angles are to be regarded only as examples.

This therefore involves two three-phase winding assemblages that are each disposed in a star configuration (hereinafter also referred to as "stars"). The star configuration can also be constructed as a delta circuit, or in mixed fashion with star and delta. The angular offset of the windings, in this case 30° electrical, can also assume a different angle, as mentioned. The winding assemblages are installed (for example) with a 30° electrical angular offset. The result is, for the two individual star circuits, a respective separate Clarke transformation that is angle-corrected:

$$\begin{bmatrix} \alpha_1 \\ \beta_1 \end{bmatrix} = \frac{2}{3} \begin{bmatrix} \cos(\pi) & \cos\left(\frac{5 \cdot \pi}{3}\right) & \cos\left(\frac{1 \cdot \pi}{3}\right) \\ \sin(\pi) & \sin\left(\frac{5 \cdot \pi}{3}\right) & \sin\left(\frac{1 \cdot \pi}{3}\right) \end{bmatrix} \begin{bmatrix} A \\ B \\ C \end{bmatrix} \quad (13)$$

$$\begin{bmatrix} \alpha_2 \\ \beta_2 \end{bmatrix} = \frac{2}{3} \begin{bmatrix} \cos\left(\frac{\pi}{2}\right) & \cos\left(\frac{7 \cdot \pi}{6}\right) & \cos\left(\frac{11 \cdot \pi}{6}\right) \\ \sin\left(\frac{\pi}{2}\right) & \sin\left(\frac{7 \cdot \pi}{6}\right) & \sin\left(\frac{11 \cdot \pi}{6}\right) \end{bmatrix} \begin{bmatrix} D \\ E \\ F \end{bmatrix}$$

$$\begin{bmatrix} \alpha_{ges} \\ \beta_{ges} \end{bmatrix} = \begin{bmatrix} \alpha_1 \\ \beta_1 \end{bmatrix} + \begin{bmatrix} \alpha_2 \\ \beta_2 \end{bmatrix}$$

In order to achieve zero torque, the condition that α and β together become zero must be met:

$$\begin{bmatrix} \alpha_{ges} \\ \beta_{ges} \end{bmatrix} = \begin{bmatrix} 0 \\ 0 \end{bmatrix} = \begin{bmatrix} \alpha_1 \\ \beta_1 \end{bmatrix} + \begin{bmatrix} \alpha_2 \\ \beta_2 \end{bmatrix} \Rightarrow \begin{bmatrix} \alpha_1 \\ \beta_1 \end{bmatrix} = -\begin{bmatrix} \alpha_2 \\ \beta_2 \end{bmatrix} \quad (14)$$

A three-phase machine has two degrees of freedom in terms of phase current selection. With the double star configuration described, four degrees of freedom exist. The method according to the present invention can thus be used.

In order to impress a torque-free current vector into a rotating field machine of this kind, it is necessary for the resulting $\alpha,\beta$ vectors of the individual stars to point with the same amplitude in opposite directions. Here as well it is therefore possible to impress a direct current that has no torque effect, for example in order to measure the stator temperature or to exploit the other possibilities of the additional degrees of freedom.

The angular position of the $\alpha,\beta$ coordinates can be selected without restriction, and can also assume a different position. What is important is the comparability of the resulting vectors of the individual windings.

What is claimed is:

1. A method for determining an ohmic resistance of stator windings of a rotating field machine operable in motor mode, in which for energizing the stator windings at least four degrees of freedom exist, the method comprising:
    ascertaining the ohmic resistance of the stator windings by applying phase currents to the stator windings, the phase currents being predefined using a vector-based method;
    wherein at least during the ascertainment of the ohmic resistance, the phase currents are predefined by the vector-based method in such a way that the phase currents oscillate with a phase-current amplitude and a phase-current frequency around average values, the phase-current amplitude and the phase-current frequency being determined based on at least one of a requested rotational speed and a requested torque, of the rotating field machine, the phase-current amplitude and the phase-current frequency being determined by the vector-based method using a first current vector, and the average values corresponding to bias currents, by which the phase currents are at least in part increased or reduced, and which are determined by the vector-based method, and which are determined in such a way that the phase currents exhibit no torque effectiveness in the rotating field machine, the bias currents being determined by the vector-based method using a second current vector different than the first current vector.

2. The method as recited in claim 1, wherein the bias currents are predefined based on a transformation specification with which second current vectors, which are independent of torque-effective first current vectors, are converted into current values.

3. The method as recited in claim 1, wherein the method is used to energize a rotating field machine, the rotating field machine being one of a synchronous or asynchronous machine.

4. The method as recited in claim 1, wherein before the ohmic resistance of the stator windings is ascertained, the stator windings are energized for a predefined time by applying the predefined phase currents to the stator windings so that the stator windings heat up.

5. The method as recited in claim 1, further comprising determining a temperature of the stator windings based on the determined ohmic resistance.

6. The method as recited in claim 1, wherein:
    the phase-current amplitude and the phase-current frequency are determined based on the transformation specification with which torque-effective first current vectors are converted into current values; and
    the bias currents are determined based on the transformation specification with which second current vectors, which are independent of the torque-effective first current vectors, are converted into current values.

7. A control device of a rotating field machine operable in motor mode, the control device configured to:
    ascertain an ohmic resistance of the stator windings by applying phase currents to the stator windings, the phase currents being predefined using a vector-based method, wherein at least during the ascertainment of the ohmic resistance, the phase currents are predefined by the vector-based method in such a way that the phase currents oscillate with a phase-current amplitude and a phase-current frequency around average values, the phase-current amplitude and the phase-current frequency being determined based on at least one of a requested rotational speed and a requested torque, of the rotating field machine, the phase-current amplitude and the phase-current frequency being determined by the vector-based method using a first current vector, and the average values corresponding to bias currents, by which the phase currents are at least in part increased or reduced, and which are determined by the vector-based method, and which are determined in such a way that the phase currents exhibit no torque effectiveness in the rotating field machine, the bias currents being determined by the vector-based method using a second current vector different than the first current vector.

8. A non-transitory machine-readable storage medium having a computer program for determining a temperature of stator windings of a rotating field machine operable in motor mode, in which for energizing the stator windings at least four degrees of freedom exist, the computer program, when executed by a processor, causing the processor to perform:
    ascertaining an ohmic resistance of the stator windings by applying phase currents to the stator windings, the phase currents being predefined using a vector-based method;
    wherein at least during the ascertainment of the ohmic resistance, the phase currents are predefined by the vector-based method in such a way that the phase currents oscillate with a phase-current amplitude and a phase-current frequency around average values, the phase-current amplitude and the phase-current frequency being determined based on at least one of a requested rotational speed and a requested torque, of the rotating field machine, the phase-current amplitude and the phase-current frequency being determined by the vector-based method using a first current vector, and the average values corresponding to bias currents, by which the phase currents are at least in part increased or reduced, and which are determined by the vector-based method, and which are determined in such a way that the phase currents exhibit no torque effectiveness in the rotating field machine, the bias currents being determined by the vector-based method using a second current vector different than the first current vector.

\* \* \* \* \*